United States Patent
Padala et al.

(10) Patent No.: US 11,797,342 B2
(45) Date of Patent: Oct. 24, 2023

(54) METHOD AND SUPPORTING NODE FOR SUPPORTING PROCESS SCHEDULING IN A CLOUD SYSTEM

(71) Applicant: Telefonaktiebolaget LM Ericsson (publ), Stockholm (SE)

(72) Inventors: Chakri Padala, Bangalore (IN); Nhi Vo, Stockholm (SE); Mozhgan Mahloo, Solna (SE); Joao Monteiro Soares, Solna (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 336 days.

(21) Appl. No.: 17/253,479

(22) PCT Filed: Jun. 20, 2018

(86) PCT No.: PCT/SE2018/050668
§ 371 (c)(1),
(2) Date: Dec. 17, 2020

(87) PCT Pub. No.: WO2019/245416
PCT Pub. Date: Dec. 26, 2019

(65) Prior Publication Data
US 2021/0173712 A1    Jun. 10, 2021

(51) Int. Cl.
*G06F 9/50* (2006.01)
*G06F 11/34* (2006.01)

(52) U.S. Cl.
CPC ........ *G06F 9/5011* (2013.01); *G06F 11/3409* (2013.01)

(58) Field of Classification Search
CPC ............................ G06F 9/5011; G06F 11/3409
See application file for complete search history.

(56) References Cited

U.S. PATENT DOCUMENTS 5,838,968 A * 11/1998 Culbert ................. G06F 9/5011
                                                            718/103
9,542,233 B1 * 1/2017 Alexander ............ G06F 9/3836
(Continued)

FOREIGN PATENT DOCUMENTS

| EP | 3 089 035 A1 | 11/2016 |
| EP | 3 226 468 A1 | 10/2017 |
| WO | 2018002991 A1 | 1/2018 |

OTHER PUBLICATIONS

International Search Report and Written Opinion issued in International Application No. PCT/SE2018/050668 dated Mar. 13, 2019 (12 pages).

(Continued)

*Primary Examiner* — Benjamin C Wu
(74) *Attorney, Agent, or Firm* — Rothwell, Figg, Ernst & Manbeck, P.C.

(57) ABSTRACT

A method and a supporting node (150) for supporting a process scheduling node (110) when scheduling a process to a first execution node (130) of a cluster (120) of execution nodes (130, 140, 150) are disclosed. The supporting node (150) receives (A140), from the first execution node (130) being selected by the process scheduling node (110) for execution of the process, a request for allocation of one or more HA devices (131, 141, 151). The supporting node (150) allocates at least one HA device (141), being associated with a second execution node (140) of the cluster (120), to the first execution node (130). The supporting node (150) reduces a value representing number of HA devices (131, 141, 151) available for allocation to the first execution node (130) while taking said at least one HA device (141) into account. The supporting node (150) sends the value to the first execution node (130). The supporting node (150) sends, to the first execution node (130), a message indicating successful allocation of said at least one HA device (141). A (Continued)

corresponding computer program (503) and a computer program carrier (505) are also disclosed.

20 Claims, 5 Drawing Sheets

(56) References Cited

U.S. PATENT DOCUMENTS

| | | | |
|---|---|---|---|
| 11,055,142 B1* | 7/2021 | Cruanes | G06F 9/5083 |
| 11,487,585 B1* | 11/2022 | Gilliland | G06F 9/5044 |
| 2002/0169907 A1* | 11/2002 | Candea | G06F 9/5011 |
| | | | 710/220 |
| 2007/0139424 A1 | 6/2007 | Tousek | |
| 2009/0213127 A1 | 8/2009 | Krishnamurthy et al. | |
| 2010/0058036 A1 | 3/2010 | Degenaro et al. | |
| 2011/0131430 A1 | 6/2011 | Krishnamurthy et al. | |
| 2016/0306668 A1 | 10/2016 | Heil et al. | |
| 2019/0050248 A1 | 2/2019 | Oohira et al. | |
| 2019/0056955 A1* | 2/2019 | Pennala | G06F 9/5077 |
| 2019/0370133 A1* | 12/2019 | Salapura | G06F 12/02 |
| 2022/0012095 A1* | 1/2022 | Ylinen | H04L 9/085 |
| 2022/0019475 A1* | 1/2022 | Dobson | G06F 9/5044 |
| 2022/0164208 A1* | 5/2022 | Olmsted-Thompson | |
| | | | G06F 9/5077 |
| 2022/0405998 A1* | 12/2022 | Velentzas | G06T 15/005 |

OTHER PUBLICATIONS

Zdenek Pohl et al., "Resource Management for the Heterogeneous Arrays of Hardware Accelerators", 2011 21st International Conference on Field Programmable Logic and Applications, IEEE, Sep. 5, 2011 (4 pages).

Weerasinghe, Jagath et al., "Disaggregated FPGAs: Network Performance Comparison against Bare-Metal Servers, Virtual Machines and Linux Containers", 2016 IEEE 8th International Conference on Cloud Computing Technology and Science, 2016 (9 pages).

Russinovich, M., "Inside Microsoft's FPGA-Based Configurable Cloud", B8063, Microsoft Build 2017, (41 pages).

Caulfield, Adrian M., et al., "A Cloud-Scale Acceleration Architecture", Microsoft Corporation, IEEE, 2016 (13 pages).

Silla, F., "Improving the Efficiency of your GPU-accelerated Cluster with rCUDA", Nov. 2012 (23 pages).

\* cited by examiner

METHOD AND SUPPORTING NODE FOR SUPPORTING PROCESS SCHEDULING IN A CLOUD SYSTEM

CROSS REFERENCE TO RELATED APPLICATION(S)

This application is a 35 U.S.C. § 371 National Stage of International Patent Application No. PCT/SE2018/050668, filed Jun. 20, 2018, designating the United States.

TECHNICAL FIELD

Embodiments herein relate to computer systems, such as networks of computer resources, cloud systems or the like. In particular, a method and a supporting node for supporting a process scheduling node when scheduling a process are disclosed. A corresponding computer program and a computer program carrier are also disclosed.

BACKGROUND

Hardware Acceleration (HA) has been known for decades, e.g. with the emergence of Graphics Processing Units (GPUs). The GPUs are useful in speeding up specialized tasks, such as image processing for still pictures and/or video.

Furthermore, more general GPUs that assist Central Processing Units (CPUs) to deal more efficiently with heavy computational workloads, including video processing, but also other processing related to e.g. big data analysis, have been introduced.

As a next step in the development of hardware acceleration, Field Programmable Gate Arrays (FPGAs) have been introduced. The FPGAs attract a lot of interest e.g. due to their energy efficient way of accelerating computing tasks. The FPGAs are configurable, by means of software, such as to adapt the hardware of the FPGA to different computing tasks.

In recent years, the term of "hardware accelerator" or "hardware acceleration device" has been used to refer to any hardware acceleration providing entity, such as GPUs, FPGAs and the like. A hardware acceleration device can, similarly to the initially introduced GPUs, be used as a co-processor, as a complete replacement to the CPU processor, or as an Instruction Set Architecture (ISA) extension in one or more CPUs.

In the last couple of years, several reconfigurable architectures have been proposed for the acceleration of cloud computing applications in data centers using FPGAs, and the interest is ramping up.

Lately, there has been a lot of effort in trying to enable the remote use of acceleration devices, sometimes referred as Acceleration-as-a-Service (AaaS). Some of the available solutions for enabling flexible and reconfigurable use of acceleration devices are Disaggregated FPGAs for example in the paper Disaggregated FPGAs: Network Performance Comparison against Bare-Metal Servers, Virtual Machines and Linux Containers' (by Jagath Weerasinghe et al presented at 2016 IEEE International Conference on Cloud Computing Technology and Science) or the paper 'A cloud-scale acceleration architecture' (by Adrian M. Caulfield et al presented at the 2016 49th Annual IEEE/ACM International Symposium on Microarchitecture) as wells as the Remote Compute Unified Device Architecture (rCUDA) (see http://www.rcuda.netwhere CUDA is an Application Programming Interface (API) which applications may call to make use of acceleration.

In view of the above, a known exemplifying cloud system comprises a main orchestrator and a cluster of execution nodes, such as physical computers, physical servers or the like. Each execution node manages its own set of resources, such as processing, memory and/or hardware acceleration resources. The hardware acceleration resources may be embodied in the form of one or more FPGAs, GPUs, Digital Signal Processors (DSPs) or the like.

When a process is to be executed by the cloud system, the main orchestrator searches among the execution nodes in order to find an execution node that fulfils requirements, in terms of available resources, such as available processing capacity, available memory capacity, available hardware acceleration devices and the like, that are deemed necessary for execution of the process. Then, the main orchestrator assigns the process to an execution node, fulfilling the requirements, whereby the execution node initiates execution of the process. In this manner, the main orchestrator may schedule the process to a particular execution node.

With the known cloud system, a disadvantage may be that the process may not be allocated to a first execution node due to that said one execution node is short of hardware acceleration devices. That is the first execution nodes have fewer available hardware acceleration devices than required in order to be able to execute the process. At the same time, a second execution node may have enough available hardware acceleration devices in order to fulfil the requirements relating to available hardware acceleration devices, but may be short of e.g. required available memory capacity. As a negative consequence, the process cannot be scheduled, i.e. allocated, to any one of the first and second execution nodes.

SUMMARY

An object may be to enable a process scheduling node, such as the above mentioned main orchestrator, to schedule a process to an execution node in a cloud system of the above mentioned kind even when resources in the cluster are unevenly distributed throughout the cluster.

According to an aspect, the object is achieved by a method, performed by a supporting node, for supporting a process scheduling node when scheduling a process to a first execution node of a cluster of execution nodes.

The supporting node receives, from the first execution node being selected by the process scheduling node for execution of the process, a request for allocation of one or more HA devices. The supporting node allocates at least one HA device, being associated with a second execution node of the cluster, to the first execution node. The supporting node reduces a value representing number of HA devices available for allocation to the first execution node while taking said at least one HA device into account.

The supporting node sends the value to the first execution node. The supporting node sends, to the first execution node, a message indicating successful allocation of said at least one HA device.

According to another aspect, the object is achieved by a supporting node configured for supporting a process scheduling node when scheduling a process to a first execution node of a cluster of execution nodes.

The supporting node is configured for receiving, from the first execution node being selected by the process scheduling node for execution of the process, a request for allocation of one or more HA devices. The supporting node is configured for allocating at least one HA device, being associated with a second execution node of the cluster, to the first execution node. The supporting node is configured for reducing a value representing number of HA devices available for allocation to the first execution node while taking said at least one HA device into account.

The supporting node is configured for sending the value to the first execution node. The supporting node is configured for sending, to the first execution node, a message indicating successful allocation of said at least one HA device.

According to further aspects, the object is achieved by a computer program and a computer program carrier corresponding to the aspects above.

In one example, relating to at least some embodiments herein, the supporting node may create a list of hardware acceleration devices from hardware acceleration devices of all, or at least several of, the execution nodes in the cluster. Furthermore, the supporting node may instruct the execution nodes of the cluster to report the value to the process scheduling node. In this manner, the process scheduling node may get the impression that many execution nodes have available hardware acceleration devices, as given by the reported value, as long as there are hardware acceleration devices available in the cluster as a whole. Consequently, the supporting node may handle the HA devices as being shared among all, or at least two, execution nodes in the cluster completely transparently to the process scheduling node. This means that the process scheduling node is unaware of that the execution nodes may report a number of HA devices derived from the list of shared HA devices.

Accordingly, when the process scheduling node makes a decision to schedule the process to the first execution node, the first execution node will request the supporting node to allocate said at least one HA device, which may be associated with the second execution node.

Moreover, the supporting node may reduce the value, since said at least one HA device of the list is no longer available for allocation to any other execution node. Thus, the supporting node may instruct at least the first execution node to report the reduced value to the process scheduling node. The supporting node may further instruct other execution nodes, affected by that said at least one HA device no longer is available, to also report the reduced value.

Additionally, the supporting node may confirm to the first execution node that the requested HA device(s) were successfully allocated to the first execution node. The requested HA device(s) may have been specified in terms of a parameter representing a certain amount of HA device(s), information about address or identity of said at least one HA device or the like.

As a result, the embodiments herein may enable more efficient usage of HA devices managed by execution nodes in the cluster e.g. by instructing the execution nodes to report, e.g. to the process scheduling node, an aggregated amount—e.g. the value mentioned above—of HA devices which are available for use by the reporting execution node, such as the first execution node.

An advantage is, hence, that the process scheduling node may be able to schedule the process to the first execution node which otherwise, i.e. without the embodiments herein, would appear as lacking requisite HA devices to be able handle the process being scheduled.

BRIEF DESCRIPTION OF THE DRAWINGS

The various aspects of embodiments disclosed herein, including particular features and advantages thereof, will be readily understood from the following detailed description and the accompanying drawings, which are briefly described in the following.

DETAILED DESCRIPTION

Figure 1:
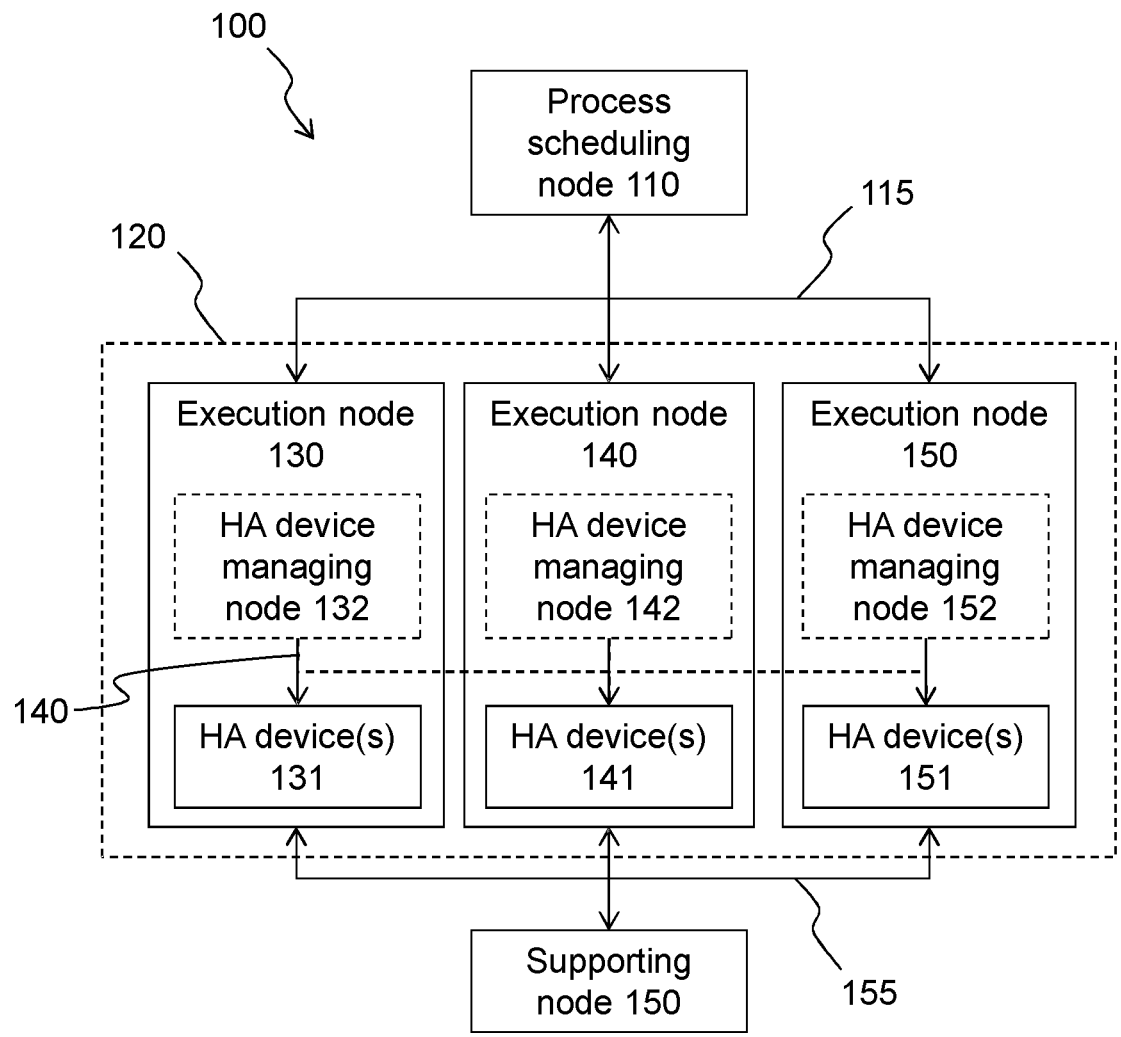
FIG. 1 is a schematic overview of an exemplifying system in which embodiments herein may be implemented.

Throughout the following description, similar reference numerals have been used to denote similar features, such as nodes, actions, modules, circuits, parts, items, elements, units or the like, when applicable. In the Figures, features that appear in some embodiments may be indicated by dashed lines.

FIG. 1 depicts an exemplifying hardware system 100 in which embodiments herein may be implemented. The hardware system 100 may be a so called disaggregated hardware system, a cloud system, a data center, a network of computers or the like.

In some examples, the system 100 may rely on a principle of hardware resource disaggregation. The principle of hardware disaggregation considers Central Processing Unit (CPU), memory and network resources as individual and modular components. The resources are often organized in pools, such as blades, sleds etc. That is, there is a pool of CPU units and a pool of memory units. The resources may comprise many other different kinds of pools, such as storage pools, pools of HA devices, pools of network interfaces, etc. When utilizing the hardware system, a host machine may be composed of a sub-set of units/resources within one or more pools. A host machine may be assembled by selecting a sub-set of resources within one or more pools. Each host machine typically includes at least one compute unit 140. In this manner, a number of resources is allocated to the host machine. In related literature, the host machine may be referred to by the terms "logical hardware machine", "virtual hardware machine" and the like.

Alternatively or additionally, the system 100 may comprise a set of physical hardware machines, such as computers, computer racks, computer blades, Personal Computers (PCs), server machines or the like.

In order to schedule one or more processes, the system 100 comprises a process scheduling node 110, such as a main orchestrating node, a master node, a system controlling node or the like. As used herein, the term "process" may refer to a workload, a container, a virtual machine or the like, which is to be executed on an execution node of a cluster 120 of execution nodes.

Accordingly, the system 100 comprises one or more execution nodes 130, 140, 150, which may be comprised in the cluster 120. An execution node may refer to a computer, a server, a virtual host machine, a host machine or the like.

Each execution node 130, 140, 150, or at least some of the execution nodes of the cluster 120, manages a respective set of HA devices 131, 141, 151. Expressed differently, e.g. a first execution node 130 may be associated with the HA device(s) 131, a second execution node 140 may be associated with the HA device(s) 141 and so on. The first execution node 130 is typically different from the second execution node 140, i.e. these execution nodes 130, 140 are not one and the same execution node.

In some embodiments, at least one of the execution nodes 130, 140, 150 may comprise a respective HA device managing node 132, 142, 152 which may be configured, statically or dynamically, to manage the associated HA devices 131, 141, 151, such as GPUs, FPGAs, accelerator devices or the like. As mentioned previously, a HA device may be exemplified by one or more ISA extensions performed on one or more CPUs. Further realisations of a HA device are known in the art. The HA device managing nodes 132, 142, 152 may be seen as a so called device plugins which manage one or more HA devices of a particular execution node 130, 140, 150.

Furthermore, the system 100 comprises a supporting node 150. The supporting node 150 manages, such as instructs, polls for information and the like, the execution nodes to effectively handle requests for HA devices from the execution nodes in response to that the process scheduling node 110 has requested a process to be executed by them. In general, the supporting node 150 may be responsible for one or more of:

selection of which HA device to be allocated for which process, e.g. in order to increase or maximize utilization of HA devices, coordination of reporting about available HA devices from execution nodes 130, 140, 150 to the process scheduling node 110, and directing of device plugin(s)/execution nodes to handle/execute requests for HA in the cluster.

In this fashion, the supporting node 150 may work side by side with the process scheduling node 110, e.g. to realize a concept of Acceleration as a Service (AaaS).

The process scheduling node 110 may communicate 115, e.g. via Application Programming Interfaces (APIs), with each execution node 130, 140, 150. The aforementioned API is typically proprietary, but this API may be specified in a standard specification, which may be specified in the future or which may already exist.

Moreover, the HA device managing nodes 132, 142, 152 may communicate 140, typically via APIs, with one or more of the HA device(s) 131, 141, 151, e.g. depending on network topology, compatibility, delay constraints etc. discussed herein further below.

Similarly to the process scheduling node 110, the supporting node 150 may communicate 155, e.g. via APIs, with each execution node 130, 140, 150 and/or each HA device managing node 132, 142, 152. However, the process scheduling node 110 is completely unaware of such communication. That is to say, the communication 155 is transparent to the process scheduling node 110. The aforementioned API is typically proprietary, but this API may be specified in a standard specification, which may be specified in the future.

The supporting node 150 may be responsible for maintaining a list representing available HA devices, instruct some or even all execution nodes, e.g. all device plugins, in the cluster 120 to report a HA device capacity, e.g. number of available HA devices, to the process scheduling node 110.

Figure 2A:
FIG. 2a to FIG. 2c are representations illustrating various lists according to some embodiments herein.
Figure 2B:
Figure 2C:
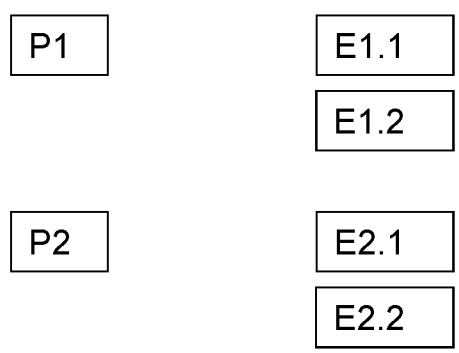

FIG. 2a, FIG. 2b and FIG. 2c illustrate exemplifying realisations of the list comprising HA devices available for use by one or more execution nodes.

As a first extreme case, there is only one list and only one set of execution nodes (e.g. all device plugins) and they all report the same amount of HA devices. As a second extreme case, there is one respective list for each execution node and each execution node reports the amount of HA devices in its respective list (however, even in this case some execution nodes may report the same amount of HA devices). In a further case, there may be e.g. 3 lists for 3 groups of execution nodes, where each group is formed based on e.g. network/connectivity topology, i.e. those execution nodes that are able to share HA devices form a group.

These cases are illustrated as follows.

In FIG. 2a, the supporting node 150 may manage only one list, or a pool, representing HA device available for use by any execution node of the cluster 120. In this example, it is thus assumed that there is only one kind of HA device in the system 100 and that all execution nodes may access, or use, any HA device in the system 100. In other examples, it may be that there are several types of HA devices, each type of HA device requiring its own list of available HA device. Furthermore, in other examples, it may be that only one, or a few, execution nodes may access some particular HA devices, in which case a list for each only one, or said few, execution nodes may be required.

Referring to FIG. 2a, a pool P1 of HA devices may be associated with all, or almost all, execution nodes E1, E2, E3 of e.g. the cluster 120 of FIG. 1. The pool P1 may be [identity of HA device #1, identity of HA device #2, identity of HA device #3 etc.] from which an amount of available HA devices may be derived, e.g. 3 (three) as in the example above.

In FIG. 2b, the supporting node 150 may manage a respective list for each one of the execution nodes 130, 140, 150 in the cluster 120. When instructing the execution nodes 130, 140, 150 about what to report to the process scheduling node 110, the supporting node 150 may indicate, such as send, a parameter indicating the number of HA devices in the respective list that corresponds to the execution node to which the parameter may be sent. However, when a certain execution node requests HA devices, the supporting node 150 may, such as in action A200, send information about which HA device to connect to. The information about said which HA device may comprise an address, an identifier or the like.

Referring to FIG. 2b, a first pool P1 may be associated with a first execution node E1, a second pool P2 may be associated with a second execution node E2 and so forth.

Furthermore, in FIG. 2c, there is provided yet another example of how the supporting node 150 may manage lists about available HA devices for use by certain execution nodes. In this example, the supporting node 150 may manage a common list for those execution nodes which are capable of accessing, or using, the same set of HA devices. A sub-cluster of execution nodes may be exclusively capable of accessing the same set of HA devices, e.g. due to network topology of the system, delay between execution nodes and HA devices and the like. Therefore, the supporting node 150 may manage a respective list for each such sub-cluster of execution nodes. Here, the term "set" may alternatively be used to refer to the cluster 120, in which case the respective list would be related to a particular sub-set of execution nodes.

Referring to FIG. 2c, a first pool P1 may be associated with a first set E1.x of execution devices E1.1, E1.2, a second pool P2 may be associated with a second set E2.x of execution devices E2.1, E2.2 and so forth for any further sets of execution devices.

As elaborated on in FIG. 2a to FIG. 2c, different execution nodes may sometimes be instructed to report different HA device capacity, e.g. different values representing HA devices available for use by the reporting execution node. The expression "HA device available for use by an execution node" may e.g. refer to that the HA device may be available for use by the first execution node 130, despite that the HA device may be managed by the second execution node 140. Thus, the "available" HA device is available to be consumed by the first execution node and/or to be consumed by a process scheduled to execute on the first execution node 130. Accordingly, the available HA device is not occupied by another process or allocated to said another process or by any other execution node. In more detail, it may be that the available HA device is partly available or completely available. E.g. assume that the HA device includes a plurality of accelerators, then all of these accelerators or only one or a few may be available.

The supporting node 150 may instruct the execution nodes, or the device plugins, what to report back to the process scheduling node 110. For example, the supporting node 150 may instruct execution nodes, or device plugins, that do not have any local HA devices to report to the master node that they actually do have HA devices, which actually are managed by other execution nodes than the reporting execution node. This creates an abstraction realized as the list and the variations of the list as described above. Accordingly, the process scheduling node 110 will be given an impression of that all, or at least some, HA devices are available for use by any execution node even if a particular execution node do in fact not manage any HA device locally.

Figure 3:
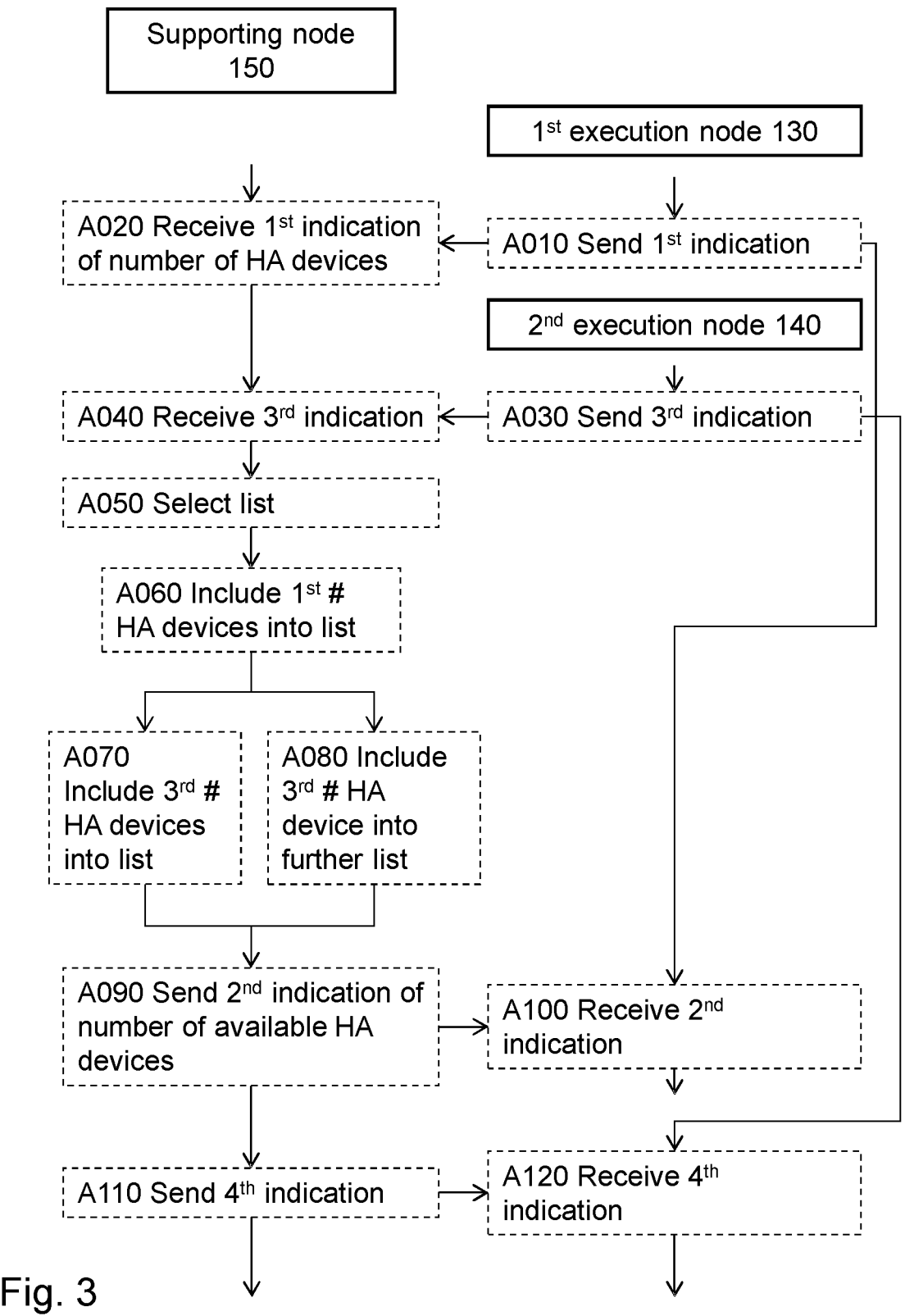
FIG. 3 and FIG. 4 are combined signalling and flowcharts illustrating the methods herein.

FIG. 3 illustrates an exemplifying method according to embodiments herein when implemented in the system 100 of FIG. 1.

The supporting node 150 performs a method for supporting a process scheduling node 110 when scheduling a process to a first execution node 130 of a cluster 120 of execution nodes 130, 140, 150.

It may be assumed that the supporting node 150 is up and running in the system 100 alongside with the process scheduling node 110. When a HA device is added, or an execution node is added to the cluster 120, the added execution node, or if existing its corresponding device plugin, may register itself to the supporting node 150, e.g. as described by one or more of actions A020-A110.

During a registration phase, e.g. according to one or more of action A020 to action A110, the supporting node 150 may receive information about HA device(s), such as number of HA device, types of HA devices, etc., from one or more execution nodes of the cluster 120. In this manner, the supporting node 150 may at least enable and/or facilitate scheduling of the process.

After the registration, or even during registration, the process may be scheduled to the first execution node 130. The scheduling of the process is handled according to one or more of action A140 to action A200.

Thus, one or more of the following actions may be performed in any suitable order.

Action A010

The first execution node 130 may send, to the supporting node 150, a first indication of a first number of available HA devices 131, managed by the first execution node 130. Thus, the first execution node 130 registers with the supporting node 150 to make the supporting node 150 aware of one or more of:
 how many HA devices the first execution node 130 manages,
 the type(s) of the HA devices managed by the first execution node 130,
 address, identity or the like of the registered HA devices, and the like.

Action A020

The supporting node 150 may receive, from the first execution node 130, the first indication of the first number of available HA devices 131, managed by the first execution node 130. As described in action A060 the first number of available HA devices may be included in a list.

Action A030

The second execution node 140 may send a third indication of a third number of available HA devices 141, managed by the second execution node 140.

Action A040

Subsequently to action A030, the supporting node 150 may receive, from the second execution node 140 of the cluster, the third indication. In this manner, multiple execution nodes may register their HA device(s) with the supporting node 150, which may update one or more lists as described herein.

In some embodiments, the supporting node 150 may receive the first indication by receiving, from the first execution node 130, a first identifier of a first type of HA device for each HA device of the first number of available HA devices. Furthermore, the supporting node 150 may receive the third indication by receiving, from the second execution node 140, a second identifier of a second type of HA device for each HA device of the third number of available HA devices. In this manner, the reporting execution nodes, such as the first and second execution nodes 130, 140, may provide information about type of HA device to the supporting node 150.

The first and third indication may be comprised in one or more registration messages. These registration messages may further comprise information about network topology, e.g. in terms of latency, sub-nets interconnecting HA devices to form "exclusive" groups. Additionally, the registration message may comprise information about name, model, capacity, of the HA devices. Further information that may support the supporting node 150 when building a network topology—in order to identity which execution nodes may share HA device(s)—may include e.g. network interface card capabilities like bandwidth, delay etc. This kind of additional information may be received by the supporting node from a 3rd party entity like a system controller (not shown) that further assists in building the network topology.

Action A050

The supporting node 150 may select a first selected list from a set of lists based on the first identifier and a second selected list from the set of lists based on the second identifier. HA devices of the first type may preferably be included in the first selected list and HA devices of the second type may preferably be included in the second selected list.

Action A060

The supporting node 150 may include the first number of available HA devices 131 into the list of HA devices.

Typically, only one of actions A070 and A080 may be performed depending on realisations of the list as described above.

Action A070

The supporting node 150 may include the third number of available HA devices 141 into the list of HA devices. In this example, the supporting node 150 may typically maintain only the list, i.e. as the one and only list.

Action A080

In this exemplifying action, the supporting node 150 maintains a respective list for each group of execution nodes, or each set of execution nodes. The groups of execution nodes may be formed based on network topology, which may determine which execution nodes may share one or more HA devices.

The supporting node 150 may include the third number of available HA devices into a further list of HA devices available for use by at least the second execution node 140.

Action A090

The supporting node 150 may send, to at least the first execution node 130, a second indication of a second, total number of HA devices in the list.

When action A070 has been performed, the supporting node 150 may further send, to the second execution node 140, the second indication of the second, total number of HA devices.

When action A080 has been performed, the supporting node 150 may further send, to the second execution node 140, information about amount of HA devices available for use by the second execution node 140, wherein the information is derived from the further list of HA devices.

Action A100

Subsequently to action A090, the first execution node 130 may receive the second indication. In this manner, the first execution node 130 is instructed to report the second, total number of HA device to the process scheduling node 110 as if being available for use by the first execution node 130.

Action A110

The supporting node 150 may send, to at least the second execution node 140, a fourth indication of a fourth, total number of HA devices in the further list.

Action A120

The second execution node 140 may receive the fourth indication. Similarly to action A100, the second execution node 140 may report to the scheduling node 110 the fourth, total number of HA devices, being available for use by the second execution node 140.

Figure 4:
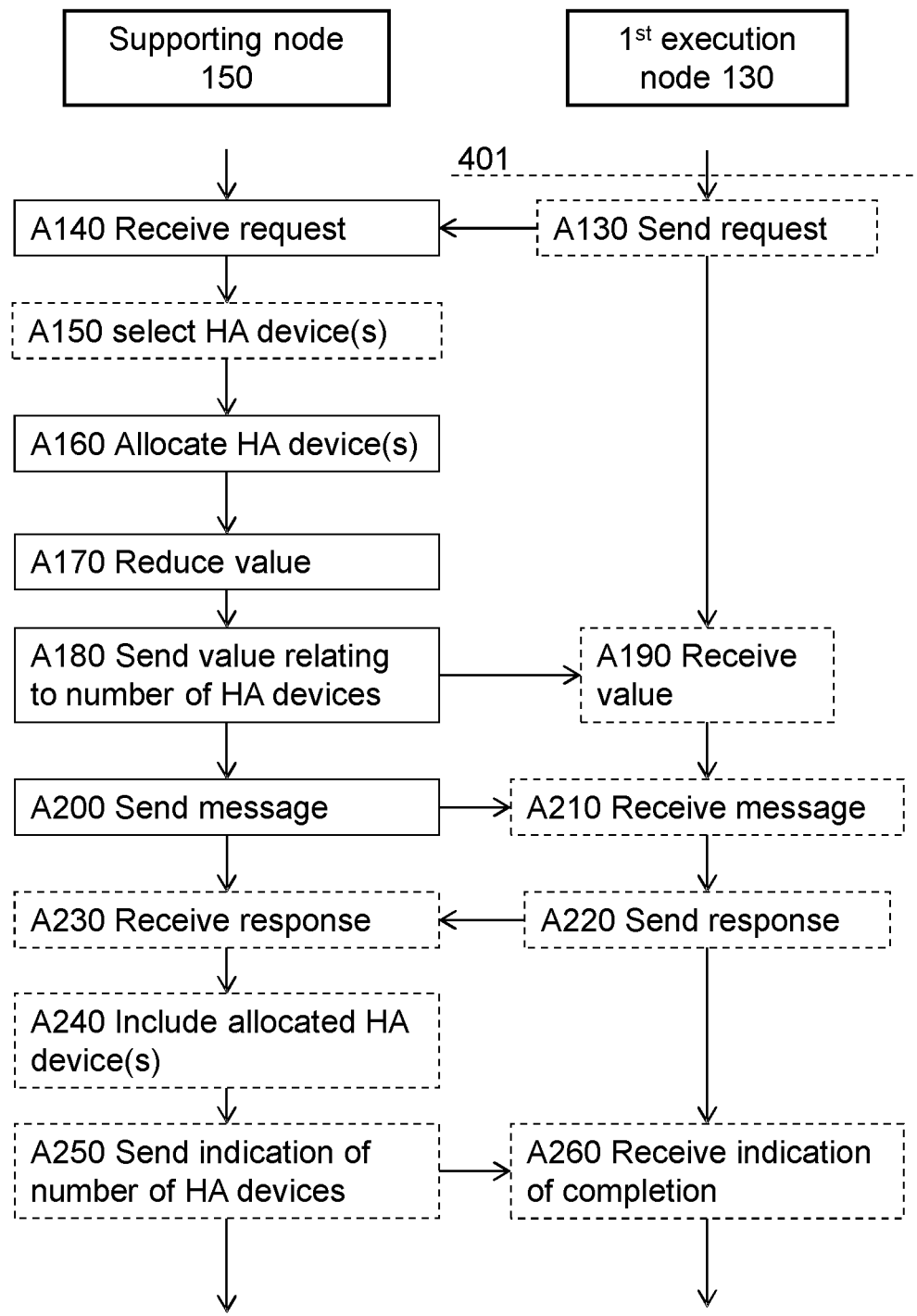

At a first stage 401, the process scheduling node 110 may have decided to schedule the process to the first execution node 130. The first stage 401 is intended to identity an approximate point in time during the execution of the actions of FIG. 4. In FIG. 4, time increases in the direction of the flow, i.e. downwards in the Figure. At this stage 401, it is not known to the process scheduling node 110 whether or not the decision can be realized by the first execution node 130. It may happen that the first execution node cannot receive any available HA device from the supporting node 150 upon request, even if the first execution node previously reported that it has available HA devices. The first execution node 130 may or may not manage one or more own HA devices.

Action A130

Accordingly, the first execution node 130 sends a request for allocation of one or more HA devices 131, 141, 151 to the supporting node 150.

In some examples, the request may solely indicate that a particular amount of HA devices are requested, e.g. in case the system 100 only includes one type of HA devices.

In some examples, the request may indicate one or more particular amounts of HA devices, each particular amount corresponding to a requested amount of HA devices of a particular type. This may be useful when the system 100 comprises HA devices of several types.

A type of HA device may herein refer to that an observed HA device fulfills certain requirements, e.g. concerning supported code types, supported acceleration functionality, processor and/or memory requirements etc.

Action A140

Subsequent to action A130, the supporting node 150 receives, from the first execution node 130 being selected by the process scheduling node 110 for execution of the process, the request.

Action A150

The supporting node 150 may select said at least one HA device 141 among HA devices of the list of HA devices available for allocation to the first execution node 130.

As part of this actions or even as part of action A130 or A140, the supporting node 150 may poll, e.g. send request and await response, all execution nodes 130, 140, 150 to find out a current number of available HA devices and optionally e.g. address and/or identify of the HA device(s). In some examples, the supporting node 150 may prioritize selection of one or more local HA devices if available.

Action A160

In order to provide hardware acceleration for the process, the supporting node 150 allocates at least one HA device 141, being associated with a second execution node 140 of the cluster 120, to the first execution node 130, which has been assigned to execute the process.

In this action, or in action A150, said at least one HA device may be reserved for exclusive use by the first execution node 130. Expressed differently, the supporting node 150 may lock said at least one HA device. In this manner, it is avoided that the same HA device may be allocated to more than one execution node.

Action A170

Since the first execution node 130 has consumed said at least one HA device, the supporting node 150 reduces a value representing number of HA devices 131, 141, 151 available for allocation to the first execution node 130 while taking said at least one HA device 141 into account. As an example, the supporting node 150 may in this fashion ensure that any locked HA device(s) are not contributing to the value representing available HA devices.

Action A180

The supporting node 150 sends the value to the first execution node 130. In response thereto, the first execution node 130 may report to the process scheduling node 110 a current amount of available HA devices.

Action A200

The supporting node 150 sends, to the first execution node 130, a message indicating successful allocation of said at least one HA device 141.

The message may comprise an instruction causing the first execution node 130 to connect to said at least one HA device 141. As an example, the instruction may include an address of said at least one HA device 141, where the address may be an identity, an identifier or the like, which uniquely identifies said at least one HA device within the cluster 120.

In its turn, the first execution node 130 may acknowledge to the process scheduling node 110 that the process is, or will be, executed by the first execution node 130. Hence, thanks to action A200, the execution node may respond to the process scheduling node that the scheduling of the process was successful.

Action A210

Subsequently to action A200, the first execution node 130 may receive the message. In response to reception of the message, the first execution node 130 may notify the process scheduling node 110 about that the process was successfully scheduled to the first execution node 130, which is about to, or has already begun to, execute the process. In its turn, the supporting node 150 may confirm back (not shown) to the process scheduling node 110 that the process has been successfully scheduled for execution by the first execution node 130.

Action A220

Once the first execution node 130 completes execution of the process, the first execution node 130 may send a response, indicating that the allocated at least one HA device 131, 141, 151 is available for inclusion in at least one list of HA devices.

Action A230

Subsequently to action A220, the supporting node 150 may receive, from the selected execution node 130, the response. In this action, the supporting node 150 may further unlock any HA devices consumed by the selected execution node 130, such as the first execution node 130.

In this manner, the supporting node 150 may become aware of that previously unavailable HA device may now again be available for allocation to some other execution node. Expressed differently, e.g. said at least one HA device may be returned to the list as in action A240.

Action A240

Therefore, the supporting node 150 may include the allocated at least one HA devices into said at least one list, whereby said at least one list is updated in terms of available HA devices 131, 141, 151.

Action A250

The supporting node 150 may send, to said at least one execution node 130 associated with said at least one updated list, a respective sixth indication of number of HA devices available for use by said at least one execution node 130.

Action A260

Subsequent to action A250, the first execution node 130 may receive the sixth indication of number of HA devices available for use by said at least one execution node 130. As mentioned above, said least one execution node 130, e.g. the first execution node 130, may then report an amount of available HA devices based on the sixth indication.

In view of the embodiments described herein, an advantage may be that no, or very little, modification to existing cloud platforms, such as the process scheduling node, is required. The request for allocation of HA device(s) may be handled by the supporting node, acting as an independent entity, running side by side with the cloud platform itself, such as the process scheduling node.

Figure 5:
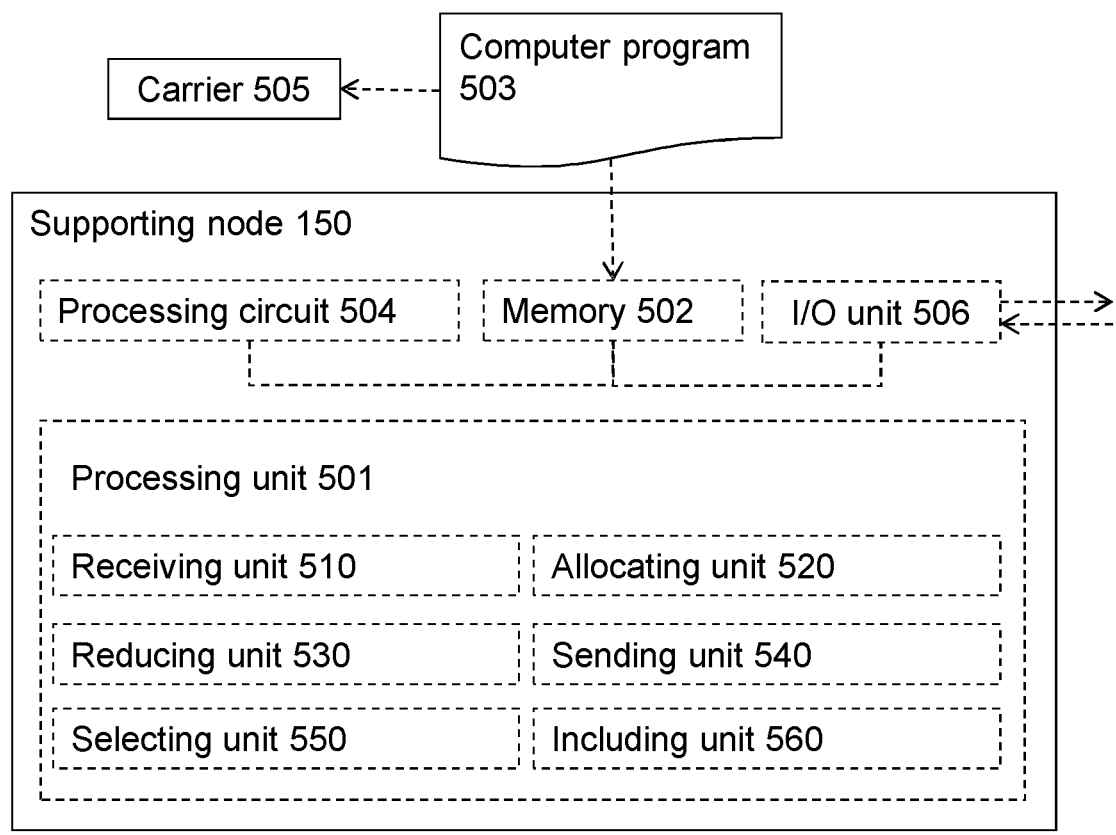
FIG. 5 is a block diagram illustrating embodiments of the supporting node.

With reference to FIG. 5, a schematic block diagram of embodiments of the supporting node 150 of FIG. 1 is shown.

The supporting node 150 may comprise a processing unit 501, such as a means for performing the methods described herein. The means may be embodied in the form of one or more hardware units and/or one or more software units. The term "unit" may thus refer to a circuit, a software block or the like according to various embodiments as described below.

The supporting node 150 may further comprise a memory 502. The memory may comprise, such as contain or store, instructions, e.g. in the form of a computer program 503, which may comprise computer readable code units.

According to some embodiments herein, the supporting node 150 and/or the processing unit 501 comprises a processing circuit 504 as an exemplifying hardware unit, which may comprise one or more processors. Accordingly, the processing unit 501 may be embodied in the form of, or 'realized by', the processing circuit 504. The instructions may be executable by the processing circuit 504, whereby the supporting node 150 is operative to perform the methods of FIG. 3 and/or FIG. 4. As another example, the instructions, when executed by the supporting node 150 and/or the processing circuit 504, may cause the supporting node 150 to perform the method according to FIG. 3 and/or FIG. 4.

In view of the above, in one example, there may be provided a supporting node 150 for supporting a process scheduling node 110 when scheduling a process to a first execution node 130 of a cluster 120 of execution nodes 130, 140, 150. Again, the memory 502 contains the instructions executable by said processing circuit 504 whereby the supporting node 150 is operative for:

receiving, from the first execution node 130 being selected by the process scheduling node 110 for execution of the process, a request for allocation of one or more HA devices 131, 141, 151, allocating at least one HA device 141, being associated with a second execution node 140 of the cluster 120, to the first execution node 130, reducing a value representing number of HA devices 131, 141, 151 available for allocation to the first execution node 130 while taking said at least one HA device 141 into account, sending the value to the first execution node 130, and sending, to the first execution node 130, a message indicating successful allocation of said at least one HA device 141.

FIG. 5 further illustrates a carrier 505, or program carrier, which provides, such as comprises, mediates, supplies and the like, the computer program 503 as described directly above. The carrier 505 may be one of an electronic signal, an optical signal, a radio signal and a computer readable medium.

In some embodiments, the supporting node 150 and/or the processing unit 501 may comprise one or more of a receiving unit 510, an allocating unit 520, a reducing unit 530, a sending unit 540, a selecting unit 550 and an including unit 560 as exemplifying hardware units. The term "unit" may refer to a circuit when the term "unit" refers to a hardware unit. In other examples, one or more of the aforementioned exemplifying hardware units may be implemented as one or more software units.

Moreover, the supporting node 150 and/or the processing unit 501 may comprise an Input/Output unit 506, which may be exemplified by the receiving unit and/or the sending unit when applicable.

Accordingly, the supporting node 150 configured for supporting a process scheduling node 110 when scheduling a process to a first execution node 130 of a cluster 120 of execution nodes 130, 140, 150.

Therefore, according to the various embodiments described above, the supporting node 150 and/or the processing unit 501 and/or the receiving unit 510 and/or the processing circuit 504 is configured for receiving, from the first execution node 130 being selected by the process scheduling node 110 for execution of the process, a request for allocation of one or more HA devices 131, 141, 151.

The supporting node 150 and/or the processing unit 501 and/or the allocating unit 520 and/or the processing circuit 504 is configured for allocating at least one HA device 141, being associated with a second execution node 140 of the cluster 120, to the first execution node 130.

The supporting node 150 and/or the processing unit 501 and/or the reducing unit 530 and/or the processing circuit 504 is configured for reducing a value representing number of HA devices 131, 141, 151 available for allocation to the first execution node 130 while taking said at least one HA device 141 into account.

The supporting node 150 and/or the processing unit 501 and/or the sending unit 540 and/or the processing circuit 504 is configured for sending the value to the first execution node 130.

The supporting node 150 and/or the processing unit 501 and/or the sending unit 540 and/or the processing circuit 504 is configured for sending, to the first execution node 130, a message indicating successful allocation of said at least one HA device 141. The message may comprise an instruction causing the first execution node 130 to connect to said at least one HA device 141.

The supporting node 150 and/or the processing unit 501 and/or the selecting unit 550 and/or the processing circuit 504 may be configured for selecting said at least one HA device 141 among a list of HA devices available for allocation to the first execution node 130.

The supporting node 150 and/or the processing unit 501 and/or the receiving unit 510 and/or the processing circuit 504 may be configured for receiving, from the first execution node 130, a first indication of a first number of available HA devices 131, managed by the first execution node 130.

The supporting node 150 and/or the processing unit 501 and/or the including unit 560 and/or the processing circuit 504 may be configured for including the first number of available HA devices 131 into the list of HA devices.

The supporting node 150 and/or the processing unit 501 and/or the sending unit 540 and/or the processing circuit 504 may be configured for sending, to at least the first execution node 130, a second indication of a second, total number of HA devices in the list.

The supporting node 150 and/or the processing unit 501 and/or the receiving unit 510 and/or the processing circuit 504 may be configured for receiving, from the second execution node 140 of the cluster, a third indication of a third number of available HA devices 141, managed by the second execution node 140.

The supporting node 150 and/or the processing unit 501 and/or the including unit 560 and/or the processing circuit 504 may be configured for including the third number of available HA devices 141 into the list of HA devices, and wherein the sending A090 of the second indication comprises sending, to the second execution node 140, the second indication of the second, total number of HA devices.

The supporting node 150 and/or the processing unit 501 and/or the including unit 560 and/or the processing circuit 504 may be configured for including the third number of available HA devices into a further list of HA devices available for use by at least the second execution node 140.

The supporting node 150 and/or the processing unit 501 and/or the sending unit 540 and/or the processing circuit 504 may be configured for sending, to at least the second execution node 140, a fourth indication of a fourth, total number of HA devices in the further list.

In some embodiments, the supporting node 150 and/or the processing unit 501 and/or the receiving unit 510 and/or the processing circuit 504 may be configured for receiving the first indication by receiving, from the execution node 130, a first identifier of a first type of HA device for each HA device of the first number of available HA devices.

In these embodiments, the supporting node 150 and/or the processing unit 501 and/or the receiving unit 510 and/or the processing circuit 504 may be configured for receiving the third indication by receiving, from the second execution node 140, a second identifier of a second type of HA device for each HA device of the third number of available HA devices.

The supporting node 150 and/or the processing unit 501 and/or the selecting unit 550 and/or the processing circuit 504 may be configured for selecting a first selected list from a set of lists based on the first identifier and a second selected list from the set of lists based on the second identifier.

The supporting node 150 and/or the processing unit 501 and/or the receiving unit 510 and/or the processing circuit 504 may be configured for receiving, from the selected execution node 130, a response indicating that the allocated at least one HA devices 131, 141, 151 is available for inclusion in at least one list of HA devices.

The supporting node 150 and/or the processing unit 501 and/or the including unit 560 and/or the processing circuit 504 may be configured for including the allocated at least one HA device into said at least one list, whereby said at least one list is updated in terms of available HA devices 131, 141, 151.

The supporting node 150 and/or the processing unit 501 and/or the sending unit 540 and/or the processing circuit 504 may be configured for sending, to said at least one execution node 130 associated with said at least one updated list, a respective sixth indication of number of HA devices available for use by said at least one execution node 130.

As used herein, the term "node", or "network node", may refer to one or more physical entities, such as devices, apparatuses, computers, servers or the like. This may mean that embodiments herein may be implemented in one physical entity. Alternatively, the embodiments herein may be implemented in a plurality of physical entities, such as an arrangement comprising said one or more physical entities, i.e. the embodiments may be implemented in a distributed manner, such as on a cloud system, which may comprise a set of server machines. In case of a cloud system, the term "node" may refer to a virtual machine, such as a container, virtual runtime environment, a software module or the like. The virtual machine may be assembled from hardware resources, such as memory, processing, network and storage resources, which may reside in different physical machines, e.g. in different computers.

As used herein, the term "unit" may refer to one or more functional units, each of which may be implemented as one or more hardware units and/or one or more software units and/or a combined software/hardware unit in a node. In some examples, the unit may represent a functional unit realized as software and/or hardware of the node.

As used herein, the term "computer program carrier", "program carrier", or "carrier", may refer to one of an electronic signal, an optical signal, a radio signal, and a computer readable medium. In some examples, the computer program carrier may exclude transitory, propagating signals, such as the electronic, optical and/or radio signal. Thus, in these examples, the computer program carrier may be a non-transitory carrier, such as a non-transitory computer readable medium.

As used herein, the term "processing unit" may include one or more hardware units, one or more software units or a combination thereof. Any such unit, be it a hardware, software or a combined hardware-software unit, may be a determining means, estimating means, capturing means, associating means, comparing means, identification means, selecting means, receiving means, sending means or the like as disclosed herein. As an example, the expression "means" may be a unit corresponding to the units listed above in conjunction with the Figures.

As used herein, the term "software unit" may refer to a software application, a Dynamic Link Library (DLL), a software component, a software module, a software object, an object according to Component Object Model (COM), a software function, a software engine, an executable binary software file or the like.

The terms "processing unit" or "processing circuit" may herein encompass a processing unit, comprising e.g. one or more processors, an Application Specific Integrated Circuit (ASIC), a Field-Programmable Gate Array (FPGA) or the like. The processing circuit or the like may comprise one or more processor kernels.

As used herein, the expression "configured to/for" may mean that a processing circuit is configured to, such as adapted to or operative to, by means of software configuration and/or hardware configuration, perform one or more of the actions described herein.

As used herein, the term "action" may refer to an action, a step, an operation, a response, a reaction, an activity or the like. It shall be noted that an action herein may be split into two or more sub-actions as applicable. Moreover, also as applicable, it shall be noted that two or more of the actions described herein may be merged into a single action.

As used herein, the term "memory" may refer to a hard disk, a magnetic storage medium, a portable computer diskette or disc, flash memory, random access memory (RAM) or the like. Furthermore, the term "memory" may refer to an internal register memory of a processor or the like.

As used herein, the term "computer readable medium" may be a Universal Serial Bus (USB) memory, a Digital Versatile Disc (DVD), a Blu-ray disc, a software unit that is received as a stream of data, a Flash memory, a hard drive, a memory card, such as a MemoryStick, a Multimedia Card (MMC), Secure Digital (SD) card, etc. One or more of the aforementioned examples of computer readable medium may be provided as one or more computer program products.

As used herein, the term "computer readable code units" may be text of a computer program, parts of or an entire binary file representing a computer program in a compiled format or anything there between.

As used herein, the expression "transmit" and "send" are considered to be interchangeable. These expressions include transmission by broadcasting, uni-casting, group-casting and the like. In this context, a transmission by broadcasting may be received and decoded by any authorized device within range. In case of uni-casting, one specifically addressed device may receive and decode the transmission. In case of group-casting, a group of specifically addressed devices may receive and decode the transmission.

As used herein, the terms "number" and/or "value" may be any kind of digit, such as binary, real, imaginary or rational number or the like. Moreover, "number" and/or "value" may be one or more characters, such as a letter or a string of letters. "Number" and/or "value" may also be represented by a string of bits, i.e. zeros and/or ones.

As used herein, the terms "first", "second", "third" etc. may have been used merely to distinguish features, apparatuses, elements, units, or the like from one another unless otherwise evident from the context.

As used herein, the term "subsequent action" may refer to that one action is performed after a preceding action, while additional actions may or may not be performed before said one action, but after the preceding action.

As used herein, the term "set of" may refer to one or more of something. E.g. a set of devices may refer to one or more devices, a set of parameters may refer to one or more parameters or the like according to the embodiments herein.

As used herein, the expression "in some embodiments" has been used to indicate that the features of the embodiment described may be combined with any other embodiment disclosed herein.

Even though embodiments of the various aspects have been described, many different alterations, modifications and the like thereof will become apparent for those skilled in the art. The described embodiments are therefore not intended to limit the scope of the present disclosure.

The invention claimed is:

1. A method, performed by a supporting node, for supporting a process scheduling node when scheduling a process to a first execution node of a cluster of execution nodes, the method comprising:
   receiving, from the first execution node being selected by the process scheduling node for execution of the process, a request for allocation of one or more Hardware Acceleration (HA) devices;
   allocating at least one HA device, being associated with a second execution node of the cluster, to the first execution node;
   reducing a value representing a number of HA devices available for allocation to the first execution node;
   sending to the first execution node the value representing the number of HA devices available for allocation to the first execution node; and
   sending, to the first execution node, a message indicating successful allocation of said at least one HA device.

2. The method according to claim 1, wherein the method further comprises:
   selecting said at least one HA device among a list of HA devices available for allocation to the first execution node.

3. The method according to claim 1, wherein the message comprises an instruction causing the first execution node to connect to said at least one HA device.

4. The method according to claim 1, wherein the method further comprises:
   receiving, from the first execution node, a first indication of a first number of available HA devices, managed by the first execution node,
   including the first number of available HA devices into the list of HA devices, and
   sending, to at least the first execution node, a second indication of a second, total number of HA devices in the list.

5. The method according to claim 4, wherein the receiving of the first indication comprises receiving, from the execution node, a first identifier of a first type of HA device for each HA device of the first number of available HA devices, and the receiving of the third indication comprises receiving, from the second execution node, a second identifier of a second type of HA device for each HA device of the third number of available HA devices.

6. The method according to claim 5, wherein the method further comprises:
   selecting a first selected list from a set of lists based on the first identifier and a second selected list from the set of lists based on the second identifier.

7. The method according to claim 1, wherein the method further comprises:
   receiving, from the second execution node of the cluster, a third indication of a third number of available HA devices, managed by the second execution node.

8. The method according to claim 7, wherein the method further comprises:
   including the third number of available HA devices into the list of HA devices, and wherein the sending of the second indication comprises sending, to the second execution node, the second indication of the second, total number of HA devices.

9. The method according to claim 1, wherein the method further comprises:
   including the third number of available HA devices into a further list of HA devices available for use by at least the second execution node, and sending, to at least the second execution node, a fourth indication of a fourth, total number of HA devices in the further list.

10. The method according to claim 1, wherein the method further comprises:
receiving, from the selected execution node, a response indicating that the allocated at least one HA device is available for inclusion into at least one list of HA devices,
including the allocated at least one HA device into said at least one list, whereby said at least one list is updated in terms of available HA devices, and
sending, to said at least one execution node associated with said at least one updated list, a respective sixth indication of number of HA devices available for use by said at least one execution node.

11. A computer program product comprising a non-transitory computer readable medium storing a computer program comprising computer readable code units which when executed on a supporting node cause the supporting node to perform the method of claim 1.

12. A supporting node, configured for supporting a process scheduling node when scheduling a process to a first execution node of a cluster of execution nodes, comprising:
a memory; and
processing circuitry coupled to the memory, wherein the supporting node is configured for:
receiving, from the first execution node being selected by the process scheduling node for execution of the process, a request for allocation of one or more Hardware Acceleration (HA) devices;
allocating at least one HA device, being associated with a second execution node of the cluster, to the first execution node;
reducing a value representing a number of HA devices available for allocation to the first execution node;
sending to the first execution node the value representing the number of HA devices available for allocation to the first execution node; and
sending, to the first execution node, a message indicating successful allocation of said at least one HA device.

13. The supporting node according to claim 12, wherein the supporting node is further configured for:
selecting said at least one HA device among a list of HA devices available for allocation to the first execution node.

14. The supporting node according to claim 12, wherein the message comprises an instruction causing the first execution node to connect to said at least one HA device.

15. The supporting node according to claim 12, wherein the supporting node is further configured for:
receiving, from the first execution node, a first indication of a first number of available HA devices, managed by the first execution node;
including the first number of available HA devices into the list of HA devices; and
sending, to at least the first execution node, a second indication of a second, total number of HA devices in the list.

16. The supporting node according to claim 15, wherein the supporting node is further configured for:
receiving the first indication by receiving, from the execution node, a first identifier of a first type of HA device for each HA device of the first number of available HA devices, and wherein the supporting node is configured for receiving the third indication by receiving, from the second execution node, a second identifier of a second type of HA device for each HA device of the third number of available HA devices; and/or
selecting a first selected list from a set of lists based on the first identifier and a second selected list from the set of lists based on the second identifier.

17. The supporting node according to claim 12, wherein the supporting node is further configured for:
receiving, from the second execution node of the cluster, a third indication of a third number of available HA devices, managed by the second execution node.

18. The supporting node according to claim 17, wherein the supporting node is further configured for:
including the third number of available HA devices into the list of HA devices, and wherein the sending of the second indication comprises sending, to the second execution node, the second indication of the second, total number of HA devices.

19. The supporting node according to claim 12, wherein the supporting node is further configured for:
including the third number of available HA devices into a further list of HA devices available for use by at least the second execution node; and
sending, to at least the second execution node, a fourth indication of a fourth, total number of HA devices in the further list.

20. The supporting node according to claim 12, wherein the supporting node is configured for:
receiving, from the selected execution node, a response indicating that the allocated at least one HA device is available for inclusion in at least one pool of the set of pools of HA devices,
including the allocated at least one HA device into said at least one list, whereby said at least one list is updated in terms of available HA devices, and
sending, to said at least one execution node associated with said at least one updated list, a respective sixth indication of number of HA devices available for use by said at least one execution node.

* * * * *